June 2, 1953   H. F. PALMER   2,640,523
TIRE CONSTRUCTION
Filed Aug. 15, 1950
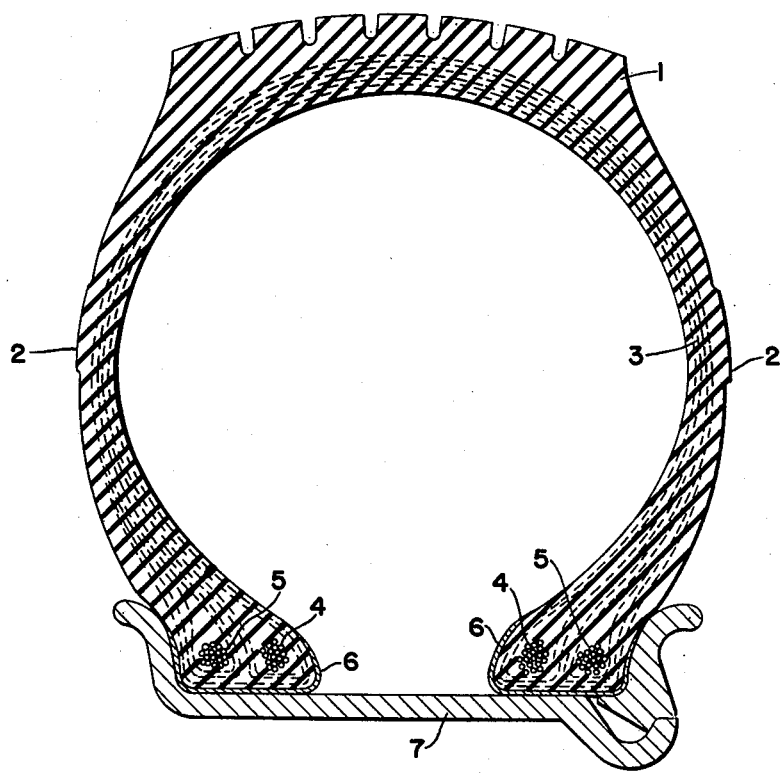
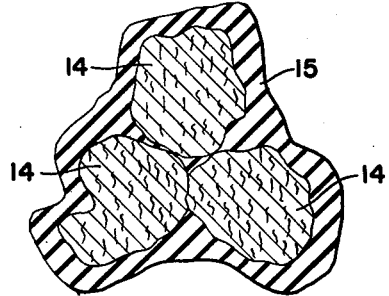
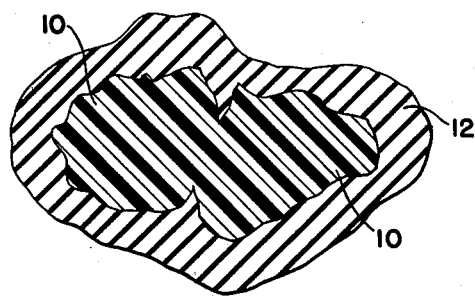
INVENTOR.
HENRY F. PALMER
BY Ely & Frye
ATTORNEYS Patented June 2, 1953

2,640,523

UNITED STATES PATENT OFFICE 2,640,523

TIRE CONSTRUCTION

Henry F. Palmer, Akron, Ohio

Application August 15, 1950, Serial No. 179,490

4 Claims. (Cl. 152—356)

1

The object of the present invention is to improve upon standard pneumatic tires with a view to overcoming certain disadvantages inherent in the usual construction of such tires. The invention may also be adapted to other analogous structures in which like problems are encountered.

In operation, pneumatic tires generate internal heat due to the constant flexing action to which they are subjected in service. Under high loads or at high speeds, or a combination of both factors, the heat generated is excessive and detrimental to the life of the tire so that premature tire failures result. This action and the effects thereof have been known and attempts have been made to dissipate the heat which is generated inside the body or carcass of the tire, but none has proved efficient or satisfactory. It is the purpose of the present invention to devise and perfect a tire construction in which the internal heat will be more effectively dissipated than has been possible in the prior constructions. This result has been accomplished without in any manner reducing or affecting the efficiency of the tire in other respects. Indeed, the tire construction is further improved in that there is a marked reduction in the tendency of the tire to "grow" or to gradually increase in cross-section, due to permanent elongation of the cords under the internal pressure of the tire.

The nature of the improvement and the benefits thereof will be described herein with reference to the drawings which show a well known and standard form of tire having the improvements embodied therein. It will be understood that the best known and preferred form of the invention is shown and described, but that the invention is not limited to the details which are fully set out, or to specific formulae, and may be modified or improved upon within the scope of the appended claims. While the tire selected for showing in the drawings is of the standard form used for heavy vehicles such as trucks or busses and in which heat generation is more of a problem, the invention may be applied to any form of tire construction.

In the drawings:

Fig. 1 is a cross-section of a tire of the so-called double bead type such as is now particularly used in large truck and bus tires;

Fig. 2 is a greatly magnified cross-section of a two-ply rayon tire cord treated in accordance with the principles of the invention; and Fig. 3 is a similar cross-section of a three-

2 ply cotton tire cord treated in accordance with the present invention.

Referring to Fig. 1, the standard tire construction comprises the usual tread 1 and side walls 2, the latter being an integral part of the tread or a separate rubber layer. The carcass 3 of the tire is made of the well known tire fabric, preferably cord fabric, laid up in as many plies as necessary in standard practice. The almost universally used fabric is of the cord type and may be either lightly wefted fabric or weftless fabric, the plies of which are thoroughly rubberized and coated with the usual friction and skim coatings as is the common practice in the art. These plies necessarily must adhere to one another and to the outer rubber layers and the practice of the present invention does not interfere with this necessary adhesion.

The plies are laid diagonally or on the bias, as is the practice, and are brought down at their inner edges and wrapped about heavy beads which extend circumferentially of the tire and hold the tire to the rim. The beads are composed of cables or tapes of steel wire prepared in any of the usual methods common in the art. They may be of the single triangular cross-section type, or in the form of tire shown in the drawings they may be of the dual type in which two steel cables 4 and 5 are employed. Around the bead areas of the tire are located the usual chafer strips 6.

The tire is mounted upon a steel rim of any of the well known types, a typical rim being shown at 7. It will be noted that each bead portion of the tire is in contact with the rim over a considerable area and that the areas of contact between the rim and the tire are in close proximity to the inner edges of all of the fabric plies and also to the bead wires themselves. There is, therefore, a substantial region in which the tire carcass and the rim are in such close contact that there is thermal conductivity between the tire and the rim.

The present invention utilizes this large heat conducting area of contact to draw the heat from the carcass and conduct it to the rim which is, of course, an excellent heat conductor and radiator and is exposed over a large area so that the heat which is drawn from the tire and collects on the rim is dissipated through the rim. The tire of the present invention runs much cooler than has been possible in the past due to the effective utilization of the rim as the means for collecting heat from the interior of the carcass and dissipating or radiating it to the air or to the wheel on which the rim is mounted.

It is also one of the benefits of the invention that, due to the presence of heat conducting elements throughout the body of the tire, the heat of vulcanization is better distributed throughout the tire resulting in more uniform vulcanization.

In the drawings no inner tube is shown as it does not enter into the combination and because the invention may be applied to tubeless tires as well as to the regular tube and tire assembly.

The body or carcass of the tire is given its strength by the several layers or plies of non-metallic material such as fabric cords made of such materials as cotton, rayon, nylon or the like. Of these materials rayon cords are most commonly used at the present time. The number of plies in passenger automobile tires is usually four or six, the number being substantially increased in truck or bus tires and hence the generation of internal heat is a much greater problem in truck and bus tires. The plied-up carcass occupies a high percentage of the total volume of the tire body as is clear from Fig. 1. The plies of cord of whatever nature are separated by thin layers of suitable rubber compound to give strength and adhesion and to prevent failures due to the rubbing of one cord against another. While the coating of rubber protects or should protect each cord from rubbing against another cord, the working of each cord in service generates a considerable amount of internal heat in the cord itself.

Both natural rubber and cotton or rayon have nearly the same thermal conductivity, the figures being respectively and approximately .0004 and .0006 defined as calories per second transmitted through a plate of the material one centimeter thick and across an area of one square centimeter when the temperature differential is 1° C. (Handbook of Chemistry and Physics, 30th edition, 1948, page 1863, Chemical Rubber Publishing Company, Cleveland, Ohio). When natural rubber or synthetic rubber is compounded in the manner suitable for use in the carcass of a tire as known in the art, the thermal conductivity of the resulting rubber compound is usually at least twice as high as the original uncompounded rubber. This is particularly true of tires in which the reinforcing pigment or filler material used is heat conductive, for example certain types of carbon black that are admirably suited for compounds used in the coating of tire cords. ("Heat Transfer Properties of Philblack-A in Natural Rubber," Philblack Bulletin #4, March 1947. Phillips Petroleum Co., Rubber Chemicals Division; "Effect of Carbon Blacks on Heat Transfer Characteristics of Vulcanizates," L. R. Sperberg, Lynn Harbison, and J. F. Svetlik, Report #797-50C, Chemical Products Department, Phillips Petroleum Co., Bartlesville, Oklahoma.)

It is apparent from the above discussion that the low termal conductivity of the usual tire cord impedes seriously any dissipation of heat generated internally in the cords or otherwise in the carcass of the tire. It is also apparent that the low conductivity of the rubber coating surrounding the cords may be increased by the use of rubber compounded with certain materials such, for example, as the carbon blacks referred to.

In comparison to the low heat conductivities of cotton and rubber, certain metals have much higher thermal conductivities, as shown by the following data at 100° C.:

| | |
|---|---|
| Silver | .992 |
| Copper | .908 |
| Gold | .703 |
| Aluminum | .49 |
| Iron (pure) | .151 |
| Steel | .107 |

(Handbook of Chemistry and Physics, 30th edition, 1948, page 1863. Chemical Rubber Publishing Company, Cleveland, Ohio.)

It is obvious that silver and aluminum, for example, have respectively thermal conductivities approximately 2000 times and 1000 times those of cotton or rubber. Accordingly, if a thin but continuous film or layer or network of a highly heat conductive metal is fabricated in a tire cord, the heat conductivity of the tire cord will be increased manyfold.

It is apparent that the use of precious metals is impracticable because of the cost and that the desirable materials are copper or aluminum, but the use of aluminum is preferred because it is readily available in very fine powder or flake form.

The metal may be deposited upon or within the cords in very fine particle form by physical, chemical or mechanical means. For example, silver may be precipitated within and on the cords by treating them with a dilute solution of silver nitrate and subsequently reducing the silver nitrate to form metallic silver. The metals may be applied, for example, aluminum, etc. by drawing the constituent fibers or the finished cords through suspensions of the metal in various media not harmful to the strength of the fibers, or by spraying, dipping, or by any other well known means. The particles or flakes of metal must be fine enough so as not to rub or cut the fibers or cords.

The media used for suspending the metallic powder for application to the tire cords are multitudinous in the various possible combinations of film formers, plasticizers, and solvents available. A reasonably comprehensive list of such film formers (or plastics), plasticizers, and solvents is given in the tabulations each year (most recent is 1950) of "Plastics Catalogue Charts" from "Modern Plastics Encyclopedia" (Plastics Catalogue Corp., 122 East 42nd Street, New York 17, N. Y.). The materials it is possible to use include those so listed, but are not limited to them.

For example, the metallic powder may be applied by spray, dip, or other means from a suspension of suitable amounts of the powder in a composition made up in parts by weight as follows:

| | |
|---|---|
| Polyvinyl acetate | 5-15 |
| Nitrostarch | 5-15 |
| Soft alkyd resin | 0-15 |
| Plasticizer | 0-3 |
| Solvent | 70-up |

The solvent may be made up using the following materials as indicated in parts by weight:

| | |
|---|---|
| Ethyl acetate | 2-5 |
| Butyl acetate | 25-60 |
| Butyl alcohol | 3-10 |
| Toluene | 10-35 |
| Xylene | 5-20 |
| Petroleum naphtha | 5-15 |

Plasticizer (tricresyl phosphate, dibutyl phthalate, etc.) In the amount of ten per cent on the weight of the film forming ingredients should be used. (The Chemical Formulary, H. Bennett, vol. VI, p. 326 (1943).)

Another combination of ingredients is, in parts by weight:

| | |
|---|---|
| Aluminum powder | 17 |
| Hydrogenated castor oil wax | 1 |
| Ester gum | 32 |
| V. M. & P. naptha | 50-up |

(The Chemical Formulary, H. Bennett, vol. V. p. 345 (1941).)

A further formulation is, in parts by weight:

| | |
|---|---|
| Aluminum powder | 85 |
| Linseed oil | 30 |
| Refined engine oil | 15 |
| Hard coumarone resin | 8 |
| Benzine (heavy) | 85-up |

(The Chemical Formulary, H. Bennett, vol. IV, p. 307 (1939).)

Further, the metallic powder may be applied in suspension in any of the usual tire cord dipping combinations commonly and presently in use in the industry. Such compositions may be benzol (or other highly aromatic solvent) solutions of natural or synthetic rubbers with auxiliary ingredients, or water suspensions based on elastomeric latices accompanied by any of the usual assisting ingredients such as resorcinolformaldehyde resins, casein, proteins and other materials commonly used for this purpose.

Any of the above described procedures may be employed and other procedures may be conceived and adopted which are suitable for the purpose. It is the object to obtain a continuous, heat-conducting sheath or network around or in the cords which will conduct the heat out of the individual cords, but which will not interfere with the adhesion between the several plies and between the outer ply and the rubber constituents on the outside of the tire. The media which have been given will not reduce or adversely affect such adhesion, but should there be any such condition, adhesives for use in treating fabric for rubberization are well known in the art, particularly as developed in the use of rayon tire cords.

The impregnation of the individual cords may be rather deep, and this is highly desirable. Such impregnation will be enhanced if proper and well known wetting agents or surface tension reducing materials are used in the metalizing.

In Fig. 2 is shown a highly magnified cross-section of a standard two-ply rayon cord, such as now commonly used, the two plies or strands being indicated by the reference numerals 10—10. There is no attempt to show the internal construction of the plies, nor the minute crevices and crannies which are characteristic of both cotton and rayon cords, but only their general outline. Around this cord is shown the covering or casing 12 which is composed of the selected compound of rubber which encases the multitude of fine particles of the conducting metal which usually takes the form of a fine network with the particles in contact so that, in effect, a continuous conductor of high thermal conductivity is provided from within the cord to the surface thereof along the entire length of the cord whereby heat generated therein is dissipated at a relatively rapid rate.

In Fig. 3 is shown a corresponding magnified section of a standard three-ply cotton cord such as is used in tire constructions. The plies or strands of cotton are indicated by the numerals 14 and the outer covering by the numeral 15.

It will be seen that in the case of both rayon and cotton, the outer sheath encloses the fine metal particles which have penetrated deeply into the cord construction. Deep impregnation of the cords is preferred as it tends to distribute the metallic particles throughout their entire cross-sectional area and leave the outer cord surface freer of the metal particles and the problem of adhesion is thereby relieved.

As noted above, the carcass plies composed of the metallized cords and the rubber composition, the heat conductivity of which is preferably enhanced by the compounding described, are closely wrapped about the bead wires which serve to collect the heat conducted to it by the cords. To be fully effective, all of the cords or fabric in the tire should be metalized and the fabric and the bead wires should be in as close contact as possible so that the heat will be effectively conducted to the bead areas of the tire and thence to the rim for dissipation or radiation. The chafer strip 6 may metalized in the same manner as the cords themselves.

In the use of tires such as described herein, the heat conductivity of the tire will be at least as high as that of the rubber compounds used, and the internal operating temperatures can be lowered to substantially increase the life of the tire.

In addition to the improved heat conductivity, the metallizing of the tire cords will result in giving the cords (and tire) greater tensile strength and less stretch (or growth), both results particularly desirable in producing a better tire.

While I have referred particularly to metallic powders composed of one element only, it is intended that all suitable alloys or mechanical mixtures of various metallic elements will fall within the scope of this invention.

Further, the application of this invention to other uses wherein rubber compounds are reinforced by various natural or synthetic fibers, and which products may need to dissipate or conduct heat, are considered to be within the scope of this invention. Such, for example, are V-belts, power transmission belts, etc.

In the case of V-belts and power transmission belts or the like, the pulleys over which the belt travels act as the heat collecting and dissipating or radiating element. It is, therefore, intended that such of the claims herein as are not strictly limited by the terms thereof to tire construction are intended to cover other forms of laminated rubber and fabric articles which are subject to internal stresses in use and hence generate internal heat which may be destructive or detrimental to the life of the article.

While aluminum powder is preferred because of the present known advantages over other metals in availability, low cost, and heat conducting properties, other metals may be employed in lieu thereof.

What is claimed is:

1. A pneumatic rubber tire having a body reinforced with cords of non-metallic material having a low heat conductivity, each cord being impregnated throughout substantially its entire cross-sectional area with metallic particles which form a substantially continuous conductor of heat from within the cords to the surface thereof, whereby heat generated within the cords is dissipated at a relatively rapid rate.

2. A pneumatic tire of claim 1 in which the metallic particles are composed of aluminum.

3. A pneumatic rubber tire having a body reinforced with plies of non-metallic cord fabric embedded therein, the plies being united by rubber compound, and each cord being impregnated throughout substantially its entire cross-sectional area with metallic particles which form a substantially continuous conductor of heat from within the cords to the surface thereof, whereby heat generated within the cords is disspiated at a relatively rapid rate.

4. A pneumatic tire of claim 3 in which the metallic particles are composed of aluminum.

HENRY F. PALMER.

References Cited in the file of this patent

UNITED STATES PATENTS

| Number | Name | Date |
|---|---|---|
| 1,175,624 | Fawkes | Mar. 14, 1916 |
| 1,383,793 | Eckel | July 5, 1921 |
| 2,423,995 | Reynolds | July 15, 1947 |
| 2,441,945 | Frolich et al. | May 25, 1948 |
| 2,475,199 | Reynolds | July 5, 1949 |
| 2,479,094 | Bicknell | Aug. 16, 1949 |
| 2,521,305 | Olson | Sept. 5, 1950 |